(12) United States Patent
Lu

(10) Patent No.: US 7,750,601 B2
(45) Date of Patent: Jul. 6, 2010

(54) CHARGING APPARATUS OF PORTABLE DEVICES

(75) Inventor: Chi-Nan Lu, Taipei (TW)

(73) Assignee: Acer Inc., Taipei (TW)

( * ) Notice: Subject to any disclaimer, the term of this patent is extended or adjusted under 35 U.S.C. 154(b) by 488 days.

(21) Appl. No.: 11/896,320

(22) Filed: Aug. 31, 2007

(65) Prior Publication Data

US 2008/0246438 A1    Oct. 9, 2008

(30) Foreign Application Priority Data

Apr. 4, 2007    (TW) ............................... 96112078 A

(51) Int. Cl.
*H01M 10/46*    (2006.01)
(52) U.S. Cl. ..................................... 320/125
(58) Field of Classification Search ................. 320/107, 320/125, 132, 134, 136, 137, 160, DIG. 21
See application file for complete search history.

(56) References Cited

U.S. PATENT DOCUMENTS 7,058,484 B1 *    6/2006    Potega .......................... 320/134
2003/0085621 A1 *    5/2003    Potega .......................... 307/18

* cited by examiner

*Primary Examiner*—Edward Tso
(74) *Attorney, Agent, or Firm*—Rosenberg, Klein & Lee

(57) ABSTRACT

The present invention relates to a charging apparatus of portable device, which charges a battery module of the portable devices. The charging apparatus includes a sensing circuit, a control unit, and a linear charging circuit. The sensing circuit detects the voltage of a power adapter when the power adapter is plug to the portable devices, and then produces a sensing signal and transmits it to the control unit. The control unit produces a control signal according to the sensing signal and the remaining capacity of the battery module. The present invention features that the linear charging circuit receives an output power of the sensing circuit and charges the battery module according the control signal.

9 Claims, 4 Drawing Sheets

CHARGING APPARATUS OF PORTABLE DEVICES

FIELD OF THE INVENTION

The present invention relates generally to a charging apparatus, and particularly to a charging apparatus of portable devices.

BACKGROUND OF THE INVENTION

In modern society with advanced technology, many technological products, for example, mobiles phones, personal digital assistants (PDAs), hand-held computers, and notebook computers, weed through the old to bring forth the new. The characteristic of convenient portability makes users exchange information, communicate with other people, access data, and accumulate knowledge anytime and anywhere. Thereby, the life quality and working efficiency of users can be enhanced. Accordingly, in order to make the usage time of said portable devices long, the application and charging of the batteries of the portable devices appear particularly important.

FIG. 1 shows a block diagram of a switching-mode charging apparatus according to the prior art. As shown in the figure, the switching-mode charging apparatus according to the prior art includes a sensing circuit 12', a switching-mode charging circuit 14', a control unit 16', a battery module 18', and a voltage converter 20' (DC/DC). When a power adapter 22' is plug to a portable device 10' and the sensing circuit 12' detects an output power of the power adapter 22', a sensing signal is produced and is transmitted to the control unit 16'. In addition, the output power is transmitted to the voltage converter 20' and the switching-mode charging circuit 14'. When the portable device 10' is turned on, because of heavy loading, the voltage converter 20' has to output larger output power. On the contrary, when the portable device 10' is turned off or in sleep state, the output power the voltage converter 20' has to output is smaller. When the portable device 10' is turned on, slow charging mode is engaged; when the portable device 10' is turned off or in sleep state, fast charging mode is performed. When the remaining capacity of the battery module 18' is full, a system management bus (SMBus) is used to transmit a signal to the control unit 16'. When the control unit 16' received the signal, a shutdown signal is transmitted to the switching-mode charging circuit 14' for controlling the switching-mode charging circuit 14' to stop charging the battery module 18'.

FIG. 2 shows a circuit schematic diagram of a switching-mode charging apparatus according to the prior art. As shown in the figure, the differences between the present figure and FIG. 1 are a first switching circuit 24', a second switching circuit 26', a resistor 28', and the switching-mode charging circuit 14'. The first switching circuit 24' is coupled between the power adapter 22' and the switching-mode charging circuit 14', and is closed according to the sensing signal. The second switching circuit 26' is coupled between the switching-mode charging circuit 14' and the battery module 18', and is closed/opened according to an enable signal transmitted by the control unit 16'. The resistor 28' is coupled between the first switching circuit 24' and the switching-mode charging circuit 14', and converts an output current of the output power to an output voltage.

The switching-mode charging circuit 14' further includes a first switch 140', a second switch 142', an inductor 144', a capacitor 146', a resistor 148', and switching-mode controller 150'. The first switch 140' couples to the resistor 28'; the second switch 142' couples to the first switch 140' and the ground; the inductor 144' couples to the first switch 140' and the second switch 142'; the capacitor 146' couples between the inductor 144' and the ground; the resistor 148' couples between the intersection of the inductor 144' and the capacitor 146', and the second switching circuit 26'.

The switching-mode controller 150' couples between the first switching circuit 24' and the second switching circuit 26', and couples to the first switch 140', the second switch 142', and the control unit 16'. The switching-mode controller 150' controls the first switch 140' and the second switch 142' according to the control signal for charging the battery module 18' in fast or slow charging modes.

However, because the switching controller 150' has to switch the first switch 140' and the second switch 142' continuously, the circuit thereof is complex. Besides, the inductor 144' is adapted in the switching-mode charging circuit 14', thereby power loss is huge. Furthermore, if the first switch 140' and the second switch 142' are located closely in circuit design, electromagnetic interference (EMI) problems tend to occur. Hence, circuit design is relatively complicated.

Accordingly, the present invention provides a novel charging apparatus of portable devices, which can prevent damage on the charging circuitry due to over-current or over-voltage. In addition, the novel charging apparatus of portable devices has low power loss, simple circuit design, and low cost.

SUMMARY

The objective of the present invention is to provide a charging apparatus of portable devices, which has simple circuit design, need not to switch frequently, and has low power loss.

Another objective of the present invention is to provide a charging apparatus of portable devices, which has circuits easy for layout, low cost, high efficiency, and low EMI.

A further objective of the present invention is to provide a charging apparatus of portable devices, which has switching circuitry for avoiding over-current or over-voltage for protecting circuits.

Still another objective of the present invention is to provide a charging apparatus of portable devices, which has protection circuitry for avoiding over-current or over-voltage for protecting circuits.

The charging apparatus of portable device according to the present invention includes a sensing circuit, a control unit, and a linear charging circuit. The sensing circuit detects the voltage of a power adapter when the power adapter is plug to the portable devices, and then produces a sensing signal and transmits it to the control unit. The control unit produces a control signal according to the sensing signal and the remaining capacity of a battery module. The present invention features that the linear charging circuit receives an output power of the sensing circuit and charges the battery module according the control signal. In addition, the present invention can switch between fast charging mode or slow charging mode according to the voltage of the battery module.

DETAILED DESCRIPTION

In order to make the structure and characteristics as well as the effectiveness of the present invention to be further understood and recognized, the detailed description of the present invention is provided as follows along with preferred embodiments and accompanying figures.

Figure 1:
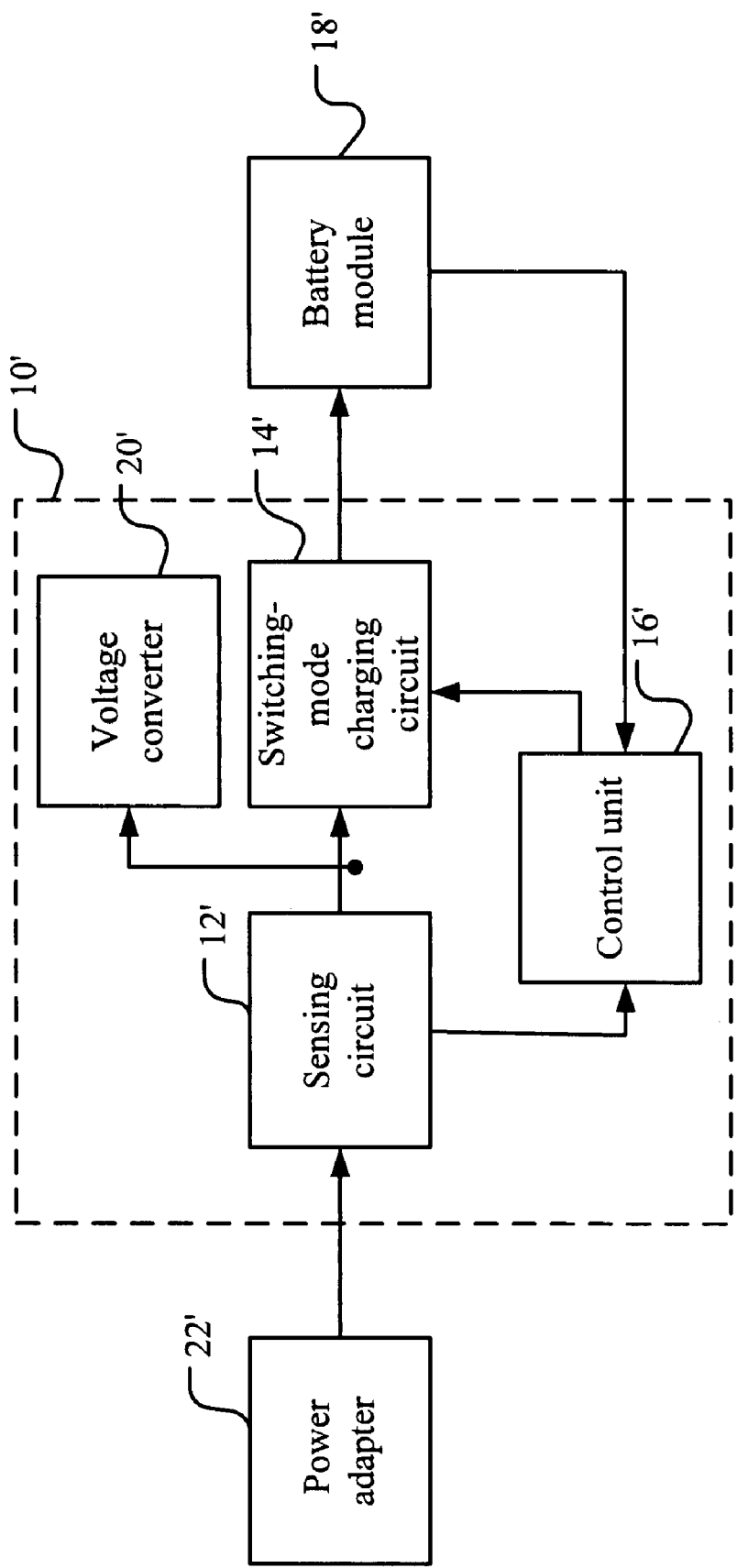
FIG. 1 shows a block diagram of a switching-mode charging apparatus according to the prior art.
Figure 2:
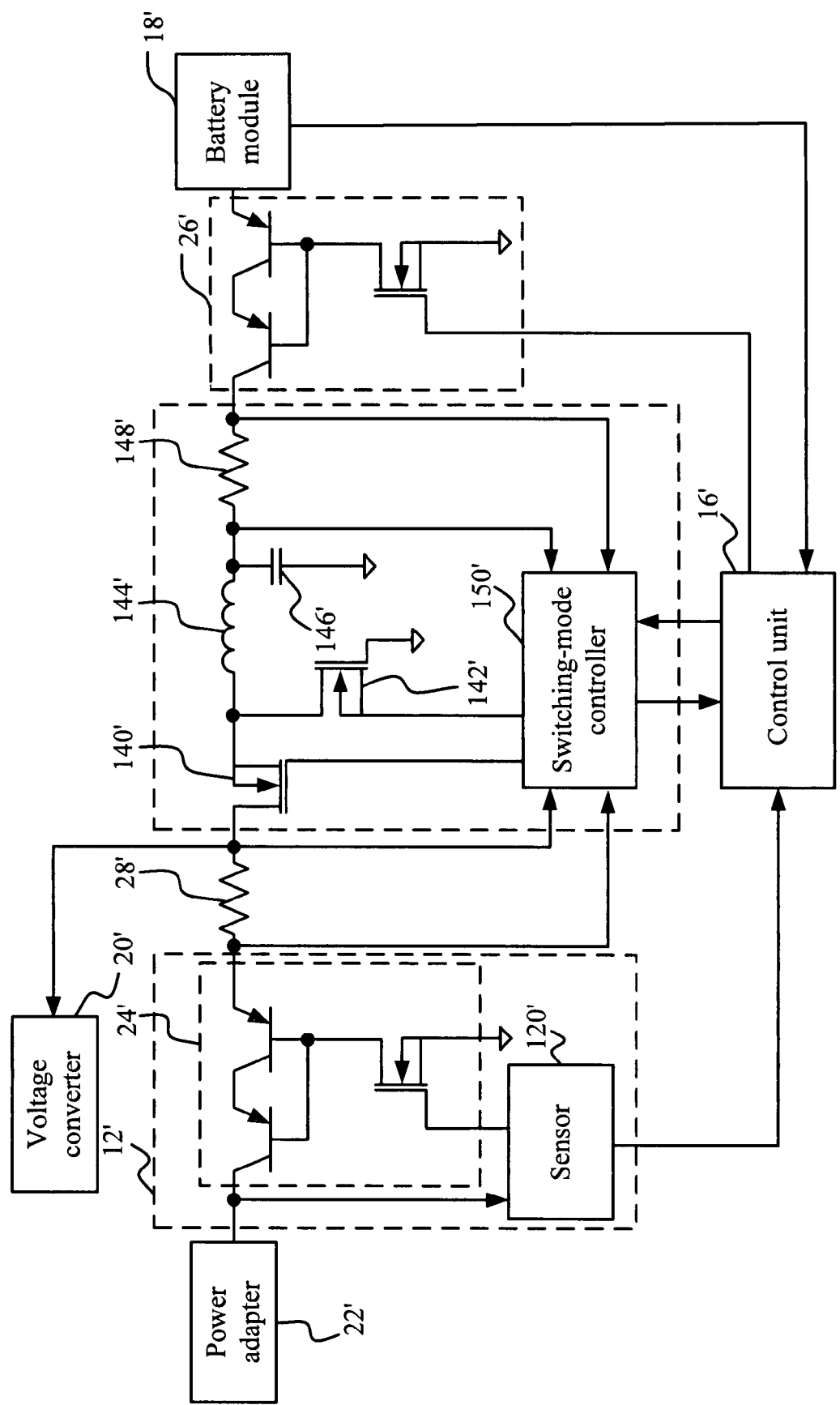
FIG. 2 shows a circuit schematic diagram of a switching-mode charging apparatus according to the prior art.
Figure 3:
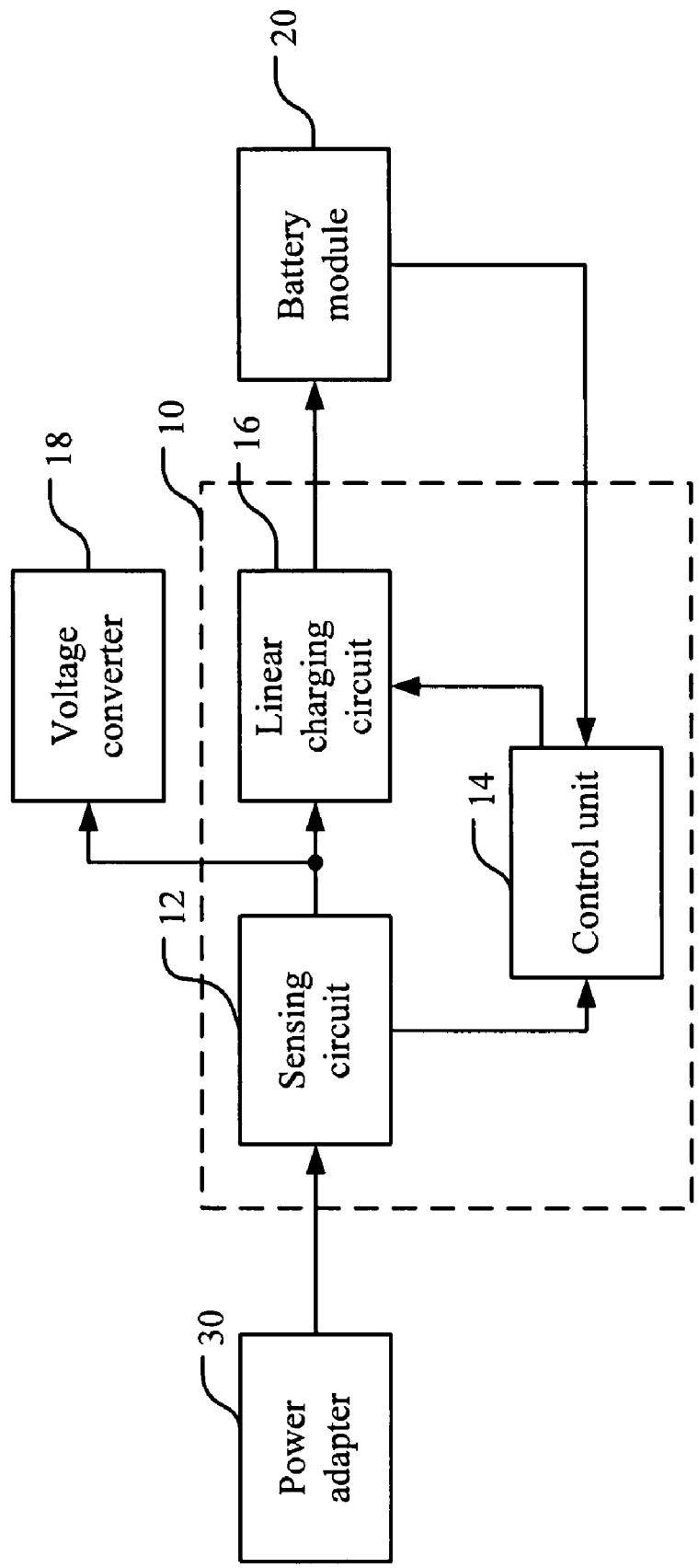
FIG. 3 shows a block diagram of a charging apparatus according to a preferred embodiment of the present embodiment.

FIG. 3 shows a block diagram of a charging apparatus according to a preferred embodiment of the present embodiment. As shown in the figure, the charging apparatus of portable devices according to the present invention includes a sensing circuit 12, a control unit 14, and a linear charging circuit 16. The charging apparatus of portable devices 10 can be applied to charge a battery module 20 of the portable devices, which can be notebook computers or personal digital assistants (PDAs). The sensing circuit 12 is used for detecting if a power adapter 30 is plug to the portable devices. When the sensing circuit 12 detects that the power adapter 30 is plug to the portable devices, a sensing signal is produced correspondingly and is transmitted to the control unit 14. The control unit 14 produces a control signal according to the sensing signal and the remaining capacity of the battery module 20. The linear charging circuit 16 receives an output power transmitted by the power adapter 30 by way of the sensing circuit 12, and charges the battery module 20 in accordance with the control signal.

The control unit 14 reads the status of the battery module 20 by means of a system management bus (SMBus) for controlling the linear charging circuit 16 to charge the battery module 20 according to the status of the battery module 20. In addition, the output power of the power adapter 30 is further transmitted to a voltage converter 40, which converts the output power transmitted by the power adapter 30 and supplies power needed by internal circuits and components of the portable devices.

Figure 4:
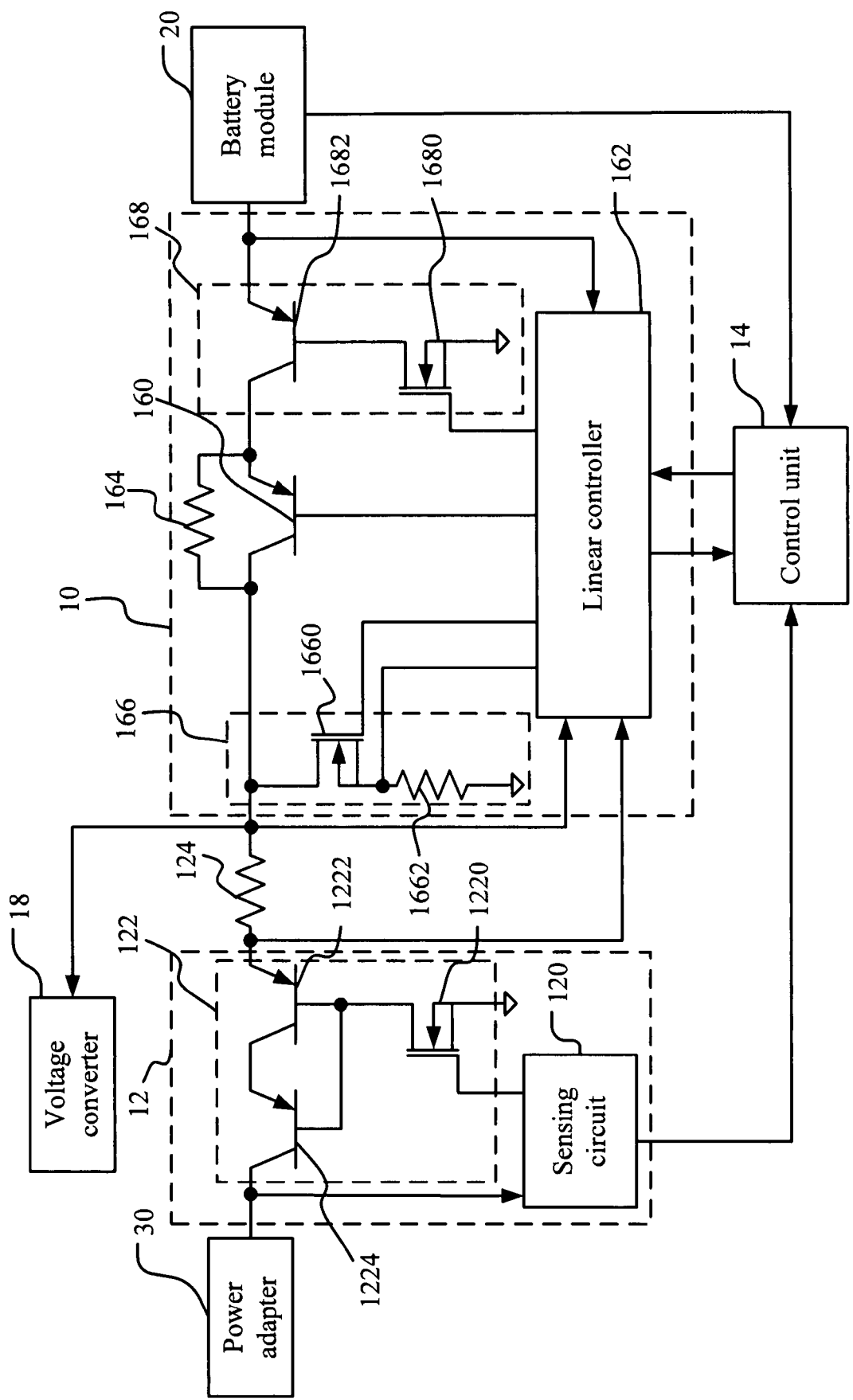
FIG. 4 shows a circuit schematic diagram of a charging apparatus according to a preferred embodiment of the present embodiment.

FIG. 4 shows a circuit schematic diagram of a charging apparatus according to a preferred embodiment of the present embodiment. As shown in the figure, the sensing circuit 12 includes a sensor 120 and a switching circuit 122. The sensor 120 is adapted in the portable devices and is coupled to the switching circuit 122 and the control unit 14. The switching circuit 122 is coupled to the linear charging circuit 16. When the power adapter 30 is plug to the portable devices, the sensor 120 is coupled between the power adapter 30 and the control unit 14. The sensor 120 is used for sensing if the power adapter 30 outputs power to the portable devices. If so, the sensor 120 will produce a corresponding sensing signal and transmit it to the control unit 14 and the switching circuit 122 for driving the switching circuit 122 to close and to transmit the output power to the linear charging circuit 16.

Because when the power adapter 20 is just plug to the portable devices, the output power transmitted to the portable devices by the power adapter 30 will bounce, the output power at this time is unstable. Thereby, when the sensor 120 is detecting the output power of the power adapter 30, the sensing signal is not transmitted to the control unit 14 and the switching circuit 122 as soon as the sensor 120 detects output power. Instead, the sensor 120 will continue to detect the output power until it turns stable, for example, when the voltage of the output power is a fixed value, then the sensing signal is transmitted to the control unit 14 and the switching circuit 122 for closing the switching circuit 122 to transmit the output power to the linear charging circuit 16. Accordingly, unstable output power can be prevented from being transmitted to the linear charging circuit 16 and affecting charging performance.

The switching circuit 122 closes according to the sensing signal. That is, when the sensor 120 detects stable output power from the power adapter 30 and transmits the sensing signal to the switching circuit 122, the switching circuit 122 closes to make the output power be transmitted to the linear charging circuit 16. Thereby, when the power adapter 30 is just plug to the portable devices, influences on internal circuits or components due to unstable output power can be avoided. Besides, when the power adapter 30 is not plug to the portable devices, the portable devices can be free from environmental noises and interferences.

The switching circuit 122 includes a first switch 1220, a second switch 1222, and a third switch 1224. The first switch 1220 couples to the sensor 120 and the ground, and closes according to the sensing signal. The second switch 1222 couples to the first switch 1220 and the linear charging circuit 16, and closes when the first switch 1220 closes. The third switch 1224 receives the output power and couples to the first switch 1220 and the second switch 1222. The third switch 1224 closes when the first switch 1220 closes as well. In addition, the description above is only a preferred embodiment of the present invention. The switching circuit 122 is not limited to be adapted in the sensing circuit 12. The switching circuit 122 can also be adapted outside the sensing circuit 12.

The linear charging circuit 16 has two charging modes including a fast charging mode and a slow charging mode. The linear charging circuit 16 includes a charging switch 160, a linear controller 162, and a charging resistor 164. The charging switch 160 is coupled between the sensing circuit 12 and the battery module 30. The linear controller 162 produces a first signal according to the control signal transmitted by the control unit 14 to control the charging switch to close/open. The charging resistor 164 is in parallel with the charging switch 160. When the charging switch closes, the output power of the power adapter 30 can charge the battery module 20 by way of the charging switch 160. If the charging switch 160 opens, the output power will charge the batter module 20 by way of the charging resistor 164. By comparing the description above, it is known that when the charging switch closes, the output power will charge the batter module 20 via the a path with smaller impedance, a large current flows to charge the battery module 20, which is the fast charging mode. On the contrary, when the charging switch opens, the output power will charge the batter module 20 via the charging resistor, which is a path with greater impedance, a small current flows to charge the battery module 20, which is the slow charging mode.

When the power adapter 30 is plug to the portable devices, the control unit 14 will detect the status of the battery module 20 and transmit the control signal to the linear controller 162 for determining whether to adopt the fast or slow charging modes to charge the battery module 20. That is, when the control unit 14 detects that the remaining capacity of the battery module 20 exceeds a threshold value, namely, a fixed percentage (70%~80% according to the present preferred embodiment) of the total capacity of the battery module 20, the control unit 14 will transmit the control signal to the linear charging circuit 16 to drive the linear charging circuit 16 to open the charging switch 160 and to adopt the slow charging mode to perform charging. On the contrary, when the remaining capacity of the battery module 20 is smaller than the threshold value, the charging switch 160 is closed to perform the fast charging mode.

In addition, another preferred embodiment of the present invention for determining whether to adopt the fast or slow charging modes to perform charging is that the control unit 14 detects if the portable devices are in a sleep state or s shutdown state. If so, the control unit 14 will control a linear controller 162 for driving the charging switch 160 to close to perform charging in the fast charging mode. Besides, in the fast charging mode, the linear controller 162 will detect the remaining capacity of the battery module 20. When the remaining capacity of reaches the threshold value, the linear controller 162 will open the charging switch 160 and switch from the fast charging mode to the slow charging mode to charge the battery module 20.

A switching circuit 168 is coupled between the charging switch 160 and the battery module 20. The linear controller 162 produces the first signal according to the control signal to close/open the switching circuit 168, that is, to start or stop charging the battery module 20 by the linear charging circuit 16. When the sensing circuit 12 detects the output power of the power adapter 30 and transmits the sensing signal to the control unit 14, the control unit 14 will be driven to control the linear controller 162 to close the switching circuit 168 for performing charging. Afterwards, when the control unit 14 detects that the battery module 20 is charged fully, it will drive the linear controller 162 to open the switching circuit 168 for stopping charging the battery module 20 by the linear charging circuit 16.

Said switching circuit 168 includes a fourth switch 1680 and a fifth switch 1682. The fourth switch 1680 couples to the linear controller 162 and the ground, and closes/opens according to the control signal. The fifth switch 1682 is coupled between the charging switch 160 and the battery module 20, and couples to the fourth switch 1680. The fifth switch 1682 closes/opens according to the state of the fourth switch 1680. When the fourth switch 1680 closes, so does the fifth switch 1682. Thereby, the output power will charge the battery module 20. When the control unit 14 detects that the battery module 20 is charged fully, it will drive the linear controller 162 to open the fourth and the fifth switches 1680, 1682. Said switching circuit 168 is only a preferred embodiment of the present invention. It can be adapted outside the linear charging circuit 16, and can be controlled closed/opened directly by the control unit 14.

Moreover, the output power by the power adapter 30 is proportional to the total power consumption of the portable devices. Thereby, the present invention detects the output power by the linear controller 162, and produces a corresponding detecting signal to the control unit 14 for informing the control unit 14 the total power consumption of the portable devices. Hence, it is judged if the current output power supplied by the power adapter 30 reaches the specified supply. Thereby, the control signal can be produced correspondingly to control close/open of the switching circuit 168. That is, when the output power is exceeding, the control unit 14 will open the switching circuit 168 for supplying the charging power to internal circuits and components of the portable devices to maintain operating performance of the portable devices. Thus, operation of the portable devices will be affected and can be protected.

When the power adapter 30 is plug to the portable devices, the voltage of the battery module 20 and the output voltage of the power adapter 30 are different. Thereby, when the switching circuit 168 closes to perform charging, the output voltage of the power adapter 30 will be lowered to the voltage of the battery module 20 to perform charging. At this moment, over-current is easy to occur, and the circuits will be affected. Hence, the linear charging circuit 16 according to the present invention further includes a protection circuit 166, which receives the output power and couples to the charging switch 160, the linear controller 162, and the ground. The linear controller 162 will produce a second signal for controlling close/open of the protection circuit 166 according to the voltage difference between the battery module 20 and the power adapter 30 prior to close of the switching circuit 168 for preventing over-current. According to the present invention, an output current of the power adapter 30 is converted to an output voltage between the switching circuit 168 and the protection circuit 166. The output voltage is transmitted to the linear controller 162 for producing the second signal according the difference between the voltage of battery module 20 and the output voltage.

The protection circuit 166 includes a protection switch 1660, which is used for receiving the output power and is coupled to the ground, the linear controller 16, and the charging switch 160. The protection switch 1660 closes/opens according to the second signal. The linear controller 162 judges first if there is difference between the voltage of the battery module 20 and the output voltage prior to close of the switching circuit 168. If the difference exists, the second signal is produced to close the protection switch 1660 and lower the output voltage. When the output voltage is equal to the voltage of the battery module 20, the linear controller 162 will open the protection switch 1660 and close the switching circuit 168. In order to prevent the output voltage being reduced to excessively low voltage, which needs time to raise voltage, the protection circuit 166 according to the present invention further includes a detection resistor 1662, which is coupled between the protection switch 1660 and the ground, and couples to the linear controller 162. The linear controller 162 will detect a current of the detection resistor 1662. If the current reaches a threshold value, the protection switch 1660 is opened. The switches described in the present invention can be transistors.

To sum up, the charging apparatus of portable devices according to the present invention includes a sensing circuit, a control unit, and a linear charging circuit. The sensing circuit detects the voltage of a power adapter when the power adapter is plug to the portable devices, and then produces a sensing signal. The control unit produces a control signal according to the sensing signal and the remaining capacity of the battery module. The linear charging circuit receives an output power of the sensing circuit and charges the battery module according the control signal.

Accordingly, the present invention conforms to the legal requirements owing to its novelty, non-obviousness, and utility. However, the foregoing description is only a preferred embodiment of the present invention, not used to limit the scope and range of the present invention. Those equivalent changes or modifications made according to the shape, structure, feature, or spirit described in the claims of the present invention are included in the appended claims of the present invention.

The invention claimed is:

1. A charging apparatus of portable devices, applied in charging a battery module of the portable devices, the charging apparatus comprising a sensing circuit and a control unit, the sensing circuit detecting the voltage of a power adapter when the power adapter is plug to the portable devices and then producing a sensing signal, and the control unit producing a control signal according to the sensing signal and the remaining capacity of the battery module, wherein the improvement comprising:

a linear charging circuit, receiving an output power of the sensing circuit and charging the battery module according the control signal.

2. The charging apparatus of claim 1, wherein the linear charging circuit charges the battery module in a corresponding fast charging mode or a slow charging mode according to the control signal.

3. The charging apparatus of claim 2, wherein the control unit detects if the portable devices are in a sleep state or in a shutdown state, the control unit transmits the control signal to the linear charging circuit for controlling the linear charging circuit to charge the battery module in the fast charging mode.

4. The charging apparatus of claim 2, wherein when the linear charging circuit charges the battery module in the fast charging mode, if the remaining capacity of the battery module is detected to reach a threshold value by the linear charging circuit, the fast charging mode is switched to the slow charging mode for charging the battery module.

5. The charging apparatus of claim 1, wherein the linear charging circuit comprises:
a charging switch, coupled between the power adapter and the battery module;
a linear controller, producing a first signal according to the control signal for controlling the charging switch to close/open, the output power of the power adapter charging the battery module in the fast charging mode by way of the charging switch when the charging switch is closed; and
a charging resistor, in parallel with the charging switch, the output power of the power adapter charging the battery module in the slow charging mode by way of the charging resistor when the charging switch is opened.

6. The charging apparatus of claim 5, wherein when the linear charging circuit charges the battery module in the fast charging mode, if the remaining capacity of the battery module is detected to reach a threshold value by the linear controller, the charging switch is opened.

7. The charging apparatus of claim 5, wherein the charging switch is a transistor.

8. The charging apparatus of claim 5, wherein the linear charging circuit further includes a protection circuit, receiving the output power and coupling to the charging switch, the linear controller, and the ground, the linear controller producing a second signal to control close/open of the protection circuit according to the difference between the power supply of the battery module and the output power.

9. The charging apparatus of claim 5, wherein the linear charging circuit further includes a switching circuit, coupled between the charging switch and the battery module, the linear controller closing/opening the switching circuit according to the first signal.

* * * * *